United States Patent [19]

Fabrizi

[11] Patent Number: 5,205,846
[45] Date of Patent: Apr. 27, 1993

[54] WATER WASH SYSTEM, AND METHODS OF CONSTRUCTING AND UTILIZING SAME

[75] Inventor: Carlo Fabrizi, Arezzo, Italy

[73] Assignee: Nova Verta North America Co., Ltd., Toronto, Canada

[21] Appl. No.: 709,832

[22] Filed: Jun. 4, 1991

[51] Int. Cl.⁵ .............................................. B01D 47/00
[52] U.S. Cl. ......................................... 55/227; 55/250; 55/259
[58] Field of Search ................. 55/227, 228, 229, 244, 55/248, 249, 250, 257.1, 259, 387; 98/115.2; 261/119.1

[56] References Cited

U.S. PATENT DOCUMENTS

| | | | |
|---|---|---|---|
| 3,409,409 | 11/1968 | Sackett, Sr. | 55/227 |
| 3,624,696 | 11/1971 | Cohen et al. | 55/223 |
| 3,628,311 | 12/1971 | Costarella et al. | 55/223 |
| 3,672,126 | 6/1972 | Goettle | 55/227 |
| 3,738,627 | 6/1973 | Scotchmur | 55/227 |
| 3,971,642 | 7/1976 | Perez | 55/227 |

FOREIGN PATENT DOCUMENTS

| | | | |
|---|---|---|---|
| 2620673 | 12/1977 | Fed. Rep. of Germany | 118/326 |
| 2813691 | 10/1979 | Fed. Rep. of Germany | 55/350 |

*Primary Examiner*—Bernard Nozick
*Attorney, Agent, or Firm*—Irving M. Weiner; Joseph P. Carrier; Pamela S. Burt

[57] ABSTRACT

An apparatus for cleaning air contaminated by paint sprays through the use of a water wash system. The paint separation compartment comprises a collection plate for directing water droplets into a main water tank, the droplets having paint therein. The apparatus also having mist arrestor and charcoal filters. The contaminated air enters at a lower end of the apparatus and cleansed or purified air is exhausted from the upper end of the apparatus.

17 Claims, 4 Drawing Sheets

WATER WASH SYSTEM, AND METHODS OF CONSTRUCTING AND UTILIZING SAME

BACKGROUND OF THE INVENTION

1. Field of the Invention

The present invention relates to an apparatus for the separation of airborne contaminants. More specifically, the air-borne contaminants are cleansed from the air utilizing a water-wash system. The apparatus is preferably utilized in connection with the automobile body shop and painting industry to prevent the exhaust of contaminated air to the ambient or surrounding area.

2. Description of the Relevant Art

Prior to the present apparatus, it has been well known to provide a dust collector in shops or work areas where large amounts of saw dust or other small air-borne particles are generated in the manufacture of products.

Additionally, it has been known to filter dust or dirt through water to remove all the contaminants. This has been done in a vacuum cleaner for household or commercial use.

SUMMARY OF THE INVENTION

According to the present invention, there is disclosed an apparatus for use in automobile body shops for the collection of air in the form of a gas steam which contains contaminates from the overspray which occurs during the painting of vehicle body parts. The apparatus removes the overspray from the gas stream by utilizing a water wash process.

It is an object of the present invention to provide a compact air cleaning apparatus for use in auto body and paint shops.

It is a further object of the present invention to provide a water wash process for removing paint overspray from a gas stream.

It is still further object of the present invention to provide an exhaust apparatus for drawing a gas stream of contaminated air into the water wash process.

The above and further object, details and advantages of the invention will become apparent from the following detailed description, when read in conjunction with the accompanying drawings.

DETAILED DESCRIPTION OF THE PREFERRED EMBODIMENTS

Figure 1:
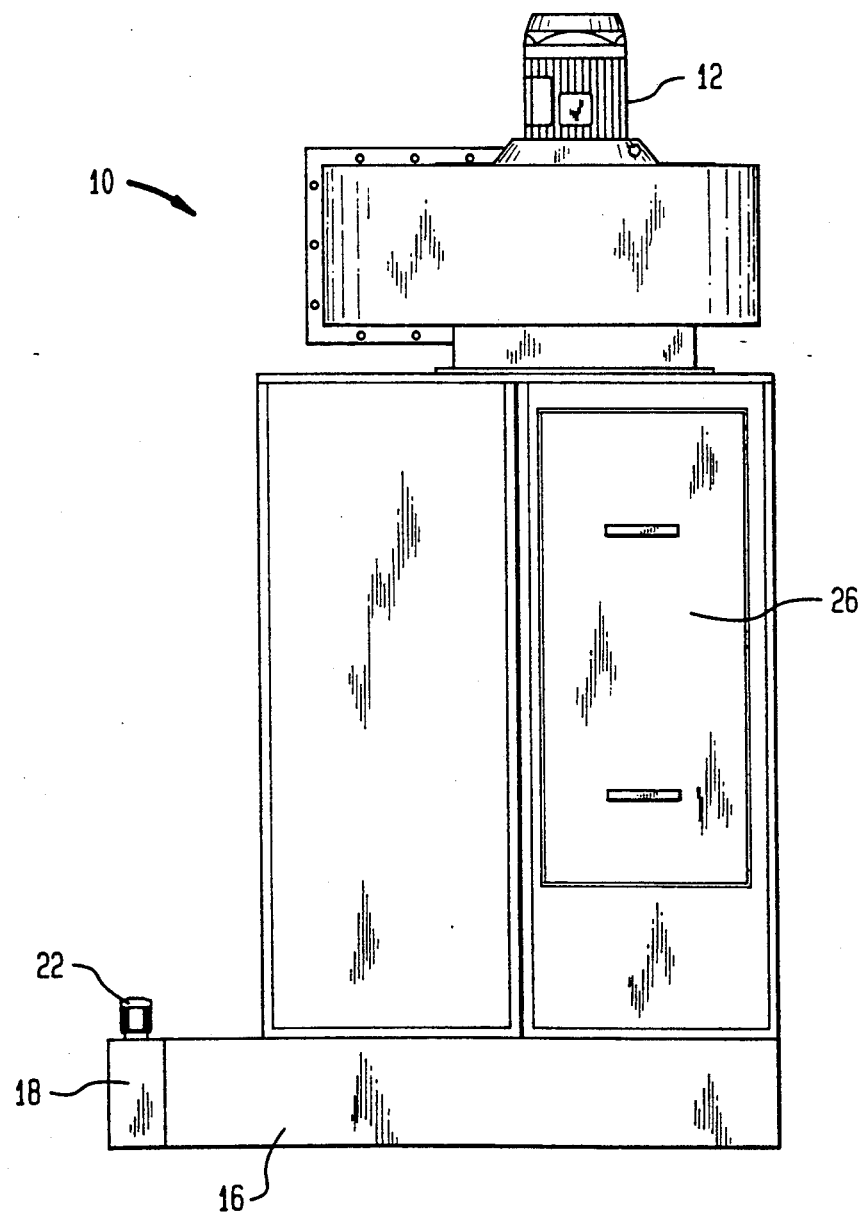
FIG. 1 illustrates a front view of the apparatus in accordance with the present invention.

Referring now to the drawings and more particularly to FIG. 1 thereof, the apparatus 10 of the present invention is shown. The apparatus 10 includes means for drawing air 12 into the apparatus which creates a gas stream illustrated by arrows 11. The means for drawing air or air flow means 12 may be interconnected with other ducts or air transfer conduits to permit exhaust of the purified gas stream to another area. This would be via exhaust aperture 14. Preferably, air flow means 12 is capable of moving at least 9000 cfs and includes an electric motor turning a fan device.

A main water tank lower water containment portion 16 is located at a lower portion of the apparatus 10. The tank 16 is interconnected with a refill means 18 which maintains the proper water level in the tank 16. This is accomplished through a level sensing means 20 and a pump 22. A tap 23 for connection to a water source, such as a hose or pipe, may also be provided. The pump 22 supplies water to the main tank 16 via pipe 24. Preferably, refill means 18 comprises a smaller second water reservoir interconnected to tank 16 by pipe 24 and pump 22.

The apparatus and housing include several access doors 26 for maintenance and cleaning purposes.

Figure 4:
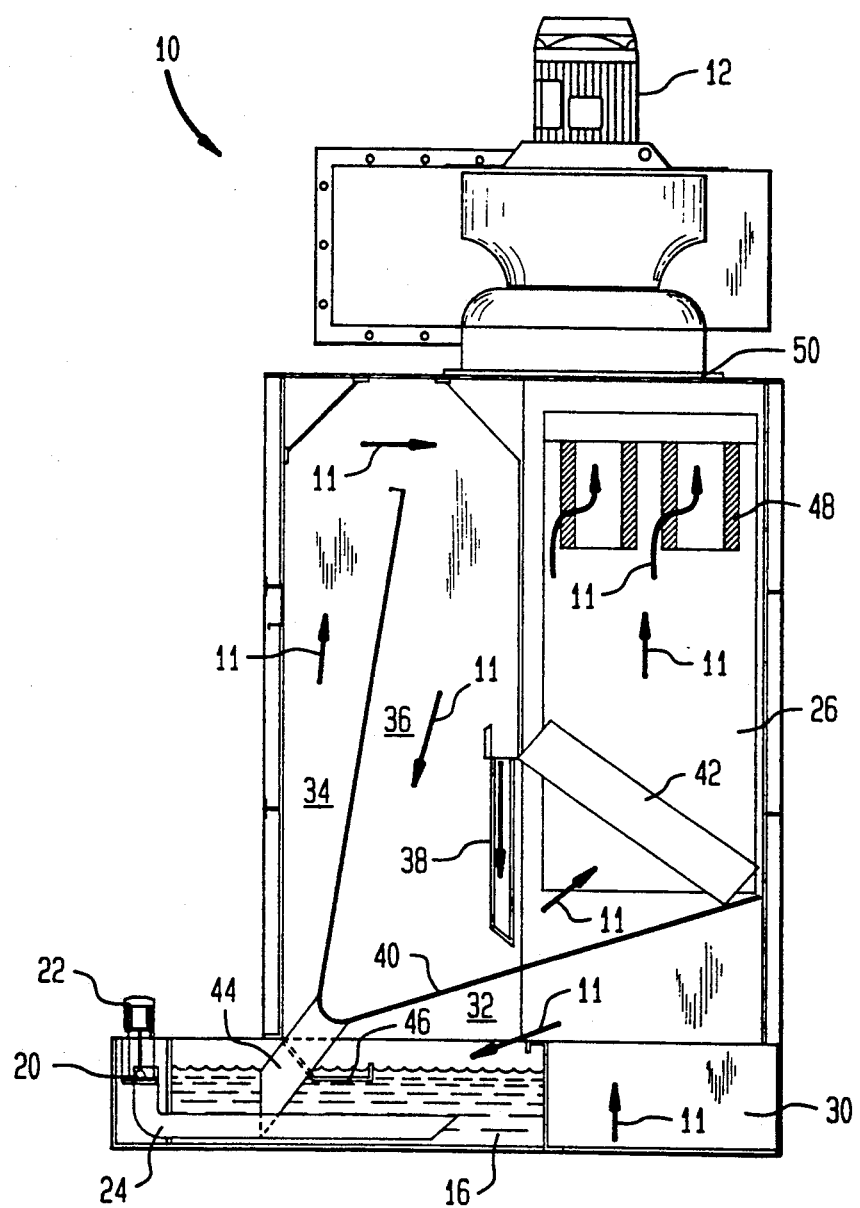
FIG. 4 illustrates a cross-section taken along line 4—4 in FIG. 3 in accordance with the present invention.

As best seen in FIG. 4, the air flow through the apparatus is shown by the arrows 11. The air flow means 12 draws a gas stream including contaminated air into the apparatus via a first aperture 30. This aperture 30 may be connected by ducts, passages or conduits to an area remote from the apparatus where the spraying of paint or other material is occurring which comprises the source of the contaminated gas stream. The term "contaminated gas stream" as relates to the present specification refers to the gas stream which contains contaminates from a spraying process, such as in the painting of vehicle parts in an auto body shop. The term "purified gas stream" relates to the gas stream which has been treated to remove the contaminants.

The gas stream flows into the water interchange cell or chamber 32 where the gas stream is saturated with water vapor. This may be accomplished by any one of several well known methods for adding moisture to a gas stream such as by spraying a mist into the gas stream.

The gas stream next proceeds upwardly through a first cell or chamber 34 and then downwardly through a second cell or chamber 36. Cells 34 and 36 comprise the paint separation chamber where the paint from the overspray contamination adheres to water droplets. This process is aided by the mixing of the gas stream that occurs therein.

Second cell 36 includes at least one drain means 38 preferably comprising at least one pipe member which directs the moisture-laden air and condensed water downwardly to a collection or drain plate 40. The downward air flow acts to force the air into the plate 40 to enhance the condensation of the moisture in the air. To ensure the condensation of the moisture in the air flow, mist arrestor 42 is additionally provided. The mist arrestor 42 drains onto collection plate 40 and essentially resembles a filter made of plastic material.

The condensed water is now contaminated with the air-borne contaminates. The water is drained into the main water tank 16 via the deposit drain pipe 44. At this point in the cleansing process, most particulate matter has been removed from the air and is suspended in the water in tank 16. A water wash feeder 46 is provided in tank 16.

After the gas stream passes through mist arrestor 42, odors or air-borne chemical solvents may remain in the air. One option for removing the contaminants comprises providing carbon filters 48 adjacent the exhaust or second aperture 50. Carbon filters are well-known in the air purification art. However, the environment of the apparatus requires use of specific materials for enclosing the carbon filters, such as aluminum.

The purified gas stream is then exhausted from the apparatus through the air flow means 12.

Due to the water vapor-laden environment in which the apparatus 10 operates, the apparatus is preferably constructed from rust-resistant materials including plastic and aluminum.

The apparatus 10 is sized so to enable small automobile paint shops to clean the paint odors and particles from the air which normally would be released into the atmosphere. Illustrative suitable dimensions for the apparatus 10 are 80¼ inches (width) by 72 inches (depth) by 83 inches (height).

The mist arrestor 26 resembles an air filter which has been constructed from plastic or water and rust resistant materials. Arrestor 26 provides a large surface area for the moisture-laden gas stream to pass through to provide means for the moisture in the gas stream to condense on. Thus, the water from the gas stream is then drained into the main tank 16.

A skimmer (not shown) may be provided in tank 16 to collect any contaminates which may accumulate near or at the water surface.

Although there has been described what is at present considered to be preferred embodiments of the invention, it will be understood that various modifications and variations may be made therein, and it is intended to cover in the appended claims all such modifications as fall within the true spirit and scope of the invention.

I claim:

1. An apparatus for the treatment of contaminated air, comprising:
   a housing having a lower water containment portion and an upper portion, said upper portion enclosing a plurality of cells and at least one chamber said cells and chamber are defined by baffles;
   a first aperture at the lower end of said upper housing portion for the admittance of contaminated air forming a gas stream;
   a water/air interchange chamber interconnected to said first aperture and connecting said upper housing portion to said water containment portion where said gas stream is water vapor saturated;
   a first cell within said upper housing portion adjacent to and interconnected with said interchange chamber wherein an upward gas stream is present;
   a second cell within said upper housing portion interconnected with and adjacent to said first cell wherein a downward gas stream flow is present;
   said first cell and said second cell comprising a contaminate separation chamber wherein contaminates adhere to water droplets and condensation collected; and
   a third cell having a first end and a second and interconnected with said second cell at a lower end thereof at said third cell first end by a third cell first aperture and having a third cell second aperture at said second end for exhaust of said gas stream comprised of purified air.

2. The apparatus of claim 1, wherein:
   said third cell having a mist arrestor adjacent said third cell first end.

3. The apparatus of claim 2, wherein:
   said third cell having carbon filter cartridges adjacent said third cell second end and before said second aperture.

4. The apparatus of claim 3, wherein:
   said first aperture being at the lower end of said apparatus adjacent a main water tank.

5. The apparatus of claim 4, wherein:
   said interchange chamber being directly above said main water tank; and
   said water tank having means for maintaining a supply of water therein.

6. The apparatus of claim 5, wherein:
   said second cell having a pick-up plate with drain pipe at its lower end for directing the vapor saturated gas stream downward.

7. The apparatus of claim 6, wherein:
   said second cell has a draining plate at its lower end which directs contaminated water collected thereon to return to said main water tank.

8. The apparatus of claim 7, wherein:
   an air flow means for drawing said gas stream into said apparatus is provided adjacent said second aperture.

9. An apparatus for use in conjunction with a spray paint booth for the removal of contaminates from the air, comprising:
   a water filtration system for the exhausts of said spray booth including a main water holding tank at the base of said apparatus and an upper housing enclosing a plurality of cells and at least one chamber said cells and chamber defined by baffles;
   means for drawing air into said apparatus;
   a first aperture in said housing for the admittance to the apparatus of contaminated air;
   said main water holding tank adjacent said first aperture having an open upper surface across which said contaminated air passes;
   an upward flow chamber and a downward flow chamber within said housing comprising a containment separation compartment;
   a collection plate within said containment separation compartment for directing contaminated water droplets to said main tank;
   mist arrestor means at the exit of said containment separation compartment for the formation of water droplets; and
   a second aperture in said housing for the exit of purified air from said apparatus.

10. The apparatus of claim 9, wherein:
    at least one charcoal cartridge is adjacent said second aperture to further purify said air.

11. The apparatus of claim 9, wherein:
    said downward flow chamber includes drain means for directing condensed water to said collection plate.

12. The apparatus of claim 11, wherein:
    said main water holding tank includes means for refilling said tank such that a sufficient amounts of water is constantly in said tank.

13. The apparatus of claim 11, wherein:
    said collection plate comprises a lower drain plate and a vertically oriented plate which separates said upward flow chamber and said downward flow chamber; and
    said lower drain plate and vertically oriented plate form a substantially V-shaped structure having at least one drain pipe at the lower end of said plates which deposits collected water into said main water holding tank.

14. The apparatus of claim 13, wherein:
    said main water tank is separated into a contaminant removal section and a air/water interchange section.

15. The apparatus of claim 14, wherein:

said removal section are and said interchange section separated by a water wash feeder.

16. The apparatus of claim 13, wherein:
said first aperture is at a lower end of said apparatus; and
said second aperture is at an upper end of said apparatus.

17. The apparatus of claim 16, wherein:
an exhaust turbine is provided adjacent said second opening which draws the contaminated air through said apparatus and exhausts the purified air.

* * * * *

UNITED STATES PATENT AND TRADEMARK OFFICE
CERTIFICATE OF CORRECTION

PATENT NO. : 5,205,846
DATED : April 27, 1993
INVENTOR(S) : Carlo Fabrizi

It is certified that error appears in the above-identified patent and that said Letters Patent is hereby corrected as shown below: Title page, item [57]

In the "ABSTRACT", line 6, before "mist arrestor" insert --a--; after "filters." insert --which are provided optionally.--.

Column 1, line 9, change "air-borne" to --airborne--;
Column 1, line 18, change "air-borne" to --airborne--;
Column 1, line 29, change "contaminates" to --contaminants--;
Column 1, line 38, delete "the";
Column 1, line 39, after "still" insert --a--;
Column 1, line 42, change "object" to --objects--;
Column 1, line 62, after "means" insert --12--;
Column 1, line 63, delete "12";
Column 1, line 64, after "arrows 11" insert --(FIG. 4)--.

Figure 2:
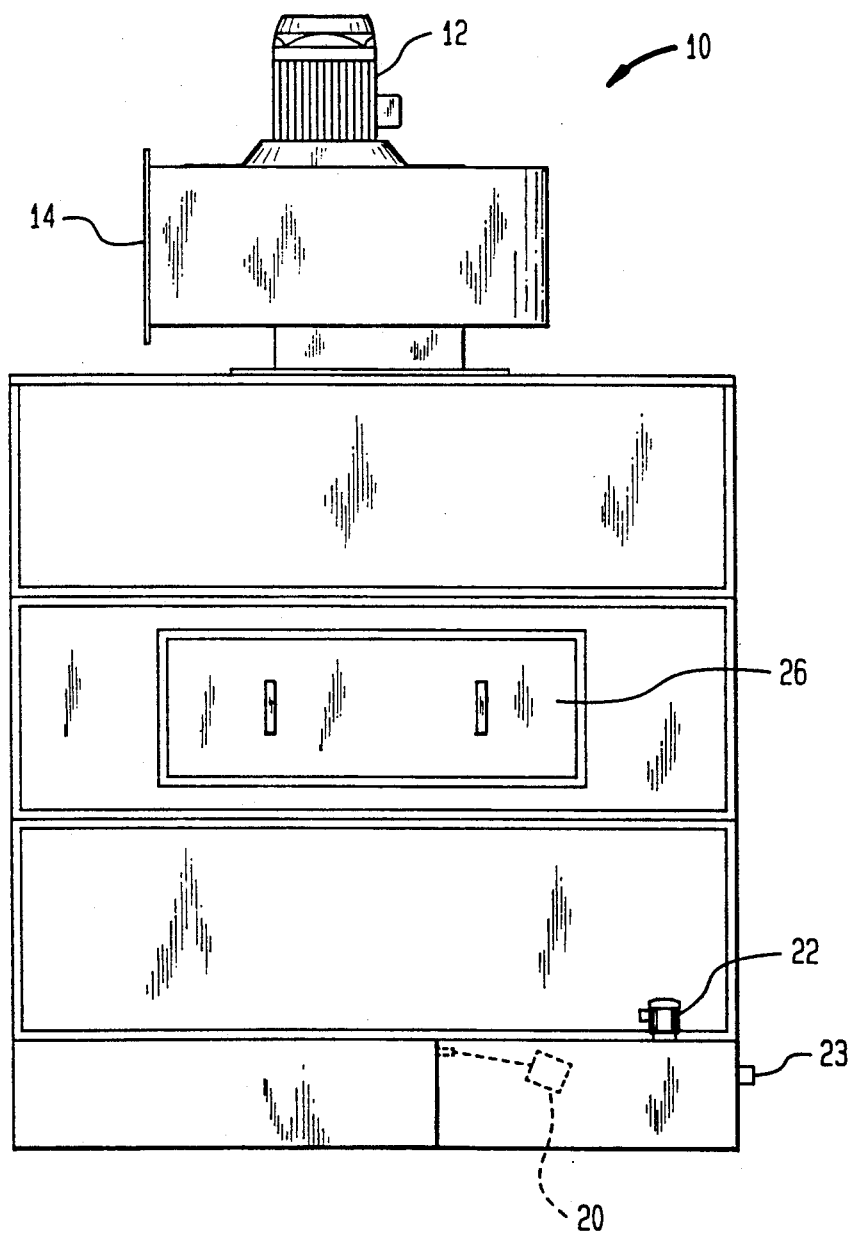
FIG. 2 illustrates a first side view of the apparatus in accordance with the present invention.
Figure 3:
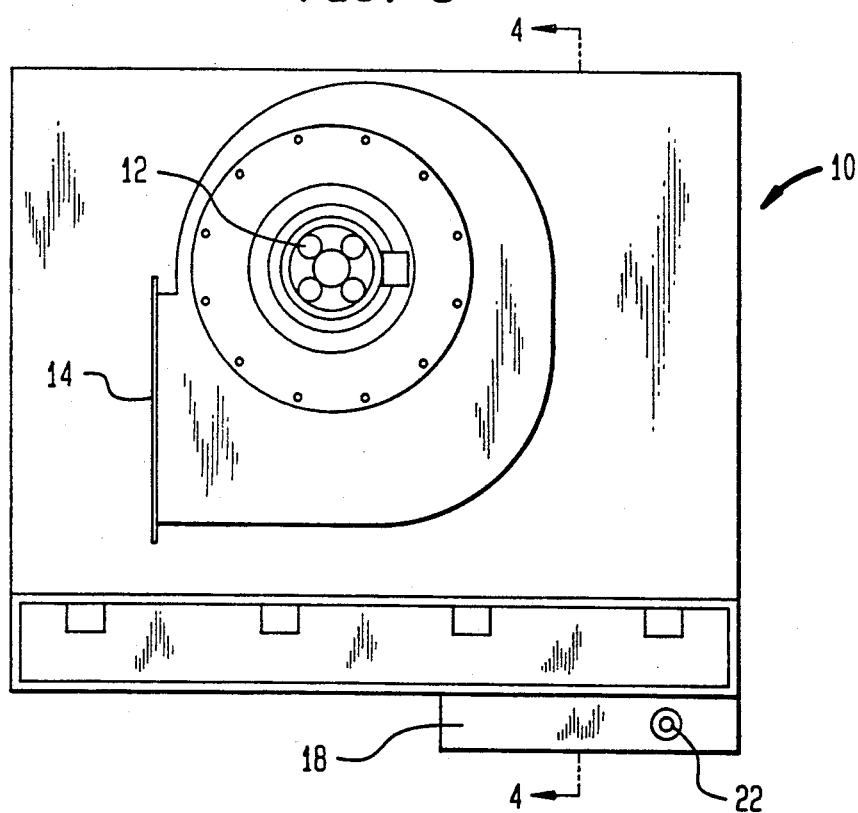
FIG. 3 illustrates a top view of the apparatus in accordance with the present invention.

Column 2, line 3, after "tank" insert --or--;
Column 2, line 7, after "20" insert --(FIG. 2)--;
Column 2, line 10, after "24" insert --(FIG. 4)--;
Column 2, lines 26-27, change "contaminates" to --contaminants--;
Column 2, line 55, change "air-borne contaminates" to --airborne contaminants--;
Column 2, line 62, change "air-borne" to --airborne--;
Column 2, line 63, after "removing" change "the" to --these--.

Column 3, line 21, change "contaminates" to --contaminants--;
Column 3, line 53 (claim 1, line 24), after "second" change "and" to --end--.

Column 4, line 7, before "drain" insert --a--;
Column 4, line 19, change "contaminates" to --contaminants--;
Column 4, line 52, change "amounts" to --amount--.

Column 5, line 1 (claim 15, line 1), after "removal section" delete "are";

UNITED STATES PATENT AND TRADEMARK OFFICE
CERTIFICATE OF CORRECTION

PATENT NO. : 5,205,846
DATED : April 27, 1993
INVENTOR(S) : Carlo Fabrizi It is certified that error appears in the above-identified patent and that said Letters Patent is hereby corrected as shown below:

Column 5, (claim 15, line 2), before "separated" insert --are--.

Signed and Sealed this

First Day of February, 1994

BRUCE LEHMAN

*Attest:*

*Attesting Officer*   *Commissioner of Patents and Trademarks*